(12) United States Patent
Ziegler et al.

(10) Patent No.: US 11,220,403 B2
(45) Date of Patent: Jan. 11, 2022

(54) DETERMINATION OF THE ENERGY EFFICIENCY OF A BELT CONVEYOR

(71) Applicant: VOITH PATENT GMBH, Heidenheim (DE)

(72) Inventors: Manfred Ziegler, Erftstadt (DE); Michael Grzybek, Stuttgart (DE); Uwe Boeker, Korb (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/977,536

(22) PCT Filed: Feb. 26, 2019

(86) PCT No.: PCT/EP2019/054690
§ 371 (c)(1),
(2) Date: Sep. 2, 2020

(87) PCT Pub. No.: WO2019/166415
PCT Pub. Date: Sep. 6, 2019

(65) Prior Publication Data
US 2021/0053768 A1  Feb. 25, 2021

(30) Foreign Application Priority Data

Mar. 2, 2018 (DE) .............................. 102018104792
Mar. 14, 2018 (DE) .............................. 102018105863

(51) Int. Cl.
*B65G 43/08* (2006.01)
*B65G 23/44* (2006.01)
*B65G 43/04* (2006.01)

(52) U.S. Cl.
CPC ............. *B65G 43/08* (2013.01); *B65G 23/44* (2013.01); *B65G 43/04* (2013.01); *B65G 2203/042* (2013.01)

(58) Field of Classification Search
CPC ........ B65G 23/44; B65G 43/04; B65G 43/00; B65G 43/08; G05B 13/04; G05B 17/02; G01G 11/003
(Continued)

(56) References Cited

U.S. PATENT DOCUMENTS 6,897,625 B2 * 5/2005 Brixius .................. B65G 43/10
                                                        198/571
10,384,881 B2    8/2019 Ziegler
(Continued)

FOREIGN PATENT DOCUMENTS

| DE | 102007002015 A1 | 7/2008 |
| EP | 3173879 A1 | 5/2017 |
| WO | 2008083809 A1 | 7/2008 |
| WO | 2017001203 A1 | 1/2017 |

OTHER PUBLICATIONS

Shirong Zhang et al. "Modeling and energy efficiency optimization of belt conveyors" Relevant to claim No. 3.5.7.8, Applied Energy, Elsevier Science Publishers, GB, vol. 88. No. 9. (Mar. 16, 2011). pp. 3061-3071. [retrieved on Mar. 21, 2011] DOI: 10.1016/J.APENERGY.2011.03.015 ISSN: 0306-2619. XP028210654.
(Continued)

*Primary Examiner* — James R Bidwell
(74) *Attorney, Agent, or Firm* — Laurence A. Greenberg; Werner H. Sterner; Ralph E. Locher (57) ABSTRACT

A method for monitoring a belt conveyor with a circulating conveyor belt includes the steps of determining at least one operating parameter of the belt conveyor; determining running resistances at different points along the conveyor belt on the basis of the at least one determined operating parameter; determining a sum of the determined running resistances over the length of the conveyor belt; and adapting the determination of the running resistances, in order to mini-
(Continued)

mize a deviation of the drive power which is calculated from the determined sum from the measured drive power.

11 Claims, 3 Drawing Sheets

(58) Field of Classification Search
USPC .................................................. 198/571, 572
See application file for complete search history.

(56) References Cited

U.S. PATENT DOCUMENTS

| 2016/0068351 | A1* | 3/2016 | MAder | ................ | B65G 43/08 |
| | | | | | 198/464.4 |
| 2019/0233219 | A1* | 8/2019 | Mader | ...................... | G01L 5/04 |

OTHER PUBLICATIONS

Lawrence K. Nordell. "Improving Belt Conveyor Efficiencies: Power. Strength and Life" Aug. 6, 2017 (Aug. 6, 2017). Retrieved from the Internet: http://www.ckit.co.za/secure/conveyor/papers/troug hed/improving/improving.htm, [retrieved on May 23, 2019] XP055591538, p. 3.

Piotr Kulinowski et al. "Department of Mining. Dressing and Transport Machines AGH Belt, Relevant to claim No. 9.10, Conveyors for Bulk Materials Calculations by CEMA 5 th Edition" (May 17, 2017). Retrieved from the Internet: https://web.archive.org/web/20170517013645if_lhttp://www.kmg.agh.edu.pl:80/sites/defaulUfiles/pdf_B eltConveyorsCalculationsCEMA5_eng.pdf [retrieved on May 23, 2019] XP055591540, p. 27-p. 29.

* cited by examiner

DETERMINATION OF THE ENERGY EFFICIENCY OF A BELT CONVEYOR

BACKGROUND OF THE INVENTION

Field of the Invention

The invention relates to a belt conveyor. In particular, the invention relates to the determination of an energy efficiency of the belt conveyor under predefined standard conditions.

A belt conveyor is usually a stationary or shiftable conveyor system for continuous conveying, and can also be called a conveyor belt, a belt conveyor, a tube belt conveyor or a band conveyor and/or can be configured as such. The belt conveyor can be used, for example, in surface mining or below ground to convey raw materials or overburden; the operation thereof is to be as energy-efficient as possible. To this end, the energy efficiency and optionally its change are to be determined over time. For example, the energy efficiency can be reduced by way of wear or a defect of the belt conveyor, or can be increased by way of maintenance, replacement of wear parts, accurate adjustment or the use of improved components. On account of the dimensions of the belt conveyor, even a small relative change can correspond to a large absolute change. Therefore, the relative accuracy of the determining should be high.

A belt conveyor is usually based on an individual design or adaptation, with the result that it is difficult to compare one conveyor with another. Moreover, a belt conveyor is usually so large that boundary conditions which can allow neutral determining or evaluating of the energy efficiency usually cannot be brought about in an active manner. The said boundary conditions can include, for example, a predefined exterior or ambient temperature or predefined, homogenous loading of the belt. In order to achieve the required determining accuracy, operating parameters of the conveyor usually have to be sensed over a relatively long time and then have to be processed, it scarcely being possible for the boundary conditions to be held constant for long enough.

SUMMARY OF THE INVENTION

An object, on which the present invention is based, consists in the providing of an improved technique for determining an energy efficiency of a belt conveyor. The invention achieves the said object by means of the subjects of the independent claims. Subclaims describe preferred embodiments.

A method for monitoring a belt conveyor with a circulating conveyor belt comprises steps of determining of at least one operating parameter of the belt conveyor; determining of running resistances at different points along the conveyor belt on the basis of the at least one determined operating parameter; determining of a sum of the determined running resistances over the length of the conveyor belt; determining of a drive power of the belt conveyor on the basis of the determined sum; and adapting of the determining of the running resistances, in order to minimize a deviation of the determined drive power from a measured drive power.

The running resistance acts counter to a movement of the conveyor belt, and is generally dependent on a load, a conveying speed, a gradient, a belt friction, a flexing resistance and possibly also further factors. The running resistance can be determined for a section of the belt conveyor or for the complete belt conveyor. A product of the running resistance and the conveying speed corresponds to the power requirement for operating the belt conveyor. A degree of efficiency of the mechanical components can additionally be taken into consideration.

The operating parameter can comprise, in particular, an ambient temperature or a load, but other or additional parameters can likewise be considered, for example a drive power, a length of the conveyor belt, a system geometry, a local load distribution, a number or condition of conveyor belt part pieces, a slack, a mean prestress, a slip angle or a lateral mean deviation of the conveyor belt at a drum, a belt temperature or a type or granularity of the material to be transported. Operating parameters of the type which have an influence on the energy efficiency of the belt conveyor are usually preferably selected. In contrast to the known solutions which form a static overall index, which is not changed during the operation of the belt conveyor, from one or more predefined operating parameters, substantially more accurate determining can thus be realised.

In one preferred embodiment, an energy efficiency of the belt conveyor is determined on the basis of the adapted determining. This determining preferably relates to a situation, in which one of the operating parameters of the belt conveyor assumes a predefined normal value. The said operating parameter can be, in particular, one of those which are used for determining the running resistances. The operating parameter can relate, for example, to an ambient temperature, and the normal value can relate to a normal temperature. The operating parameter can also comprise a load, and the normal parameter can comprise a normal load. Here, it can additionally be assumed that the normal load is distributed homogeneously on the conveyor belt.

The more accurately the energy efficiency of a belt conveyor can be determined, the better influences which impair the said efficiency can be discovered early. Influences of this type can comprise, for example, an increasing contamination of system parts, a deterioration of the orientation state of loadbearing rollers with respect to the conveyor belt, a change of belt properties on account of ageing and wear, and increased rolling resistance of loadbearing rollers on account of wear, excessively low belt tensioning or a deterioration of the degree of efficiency of a drive, for instance as a result of damage to a gear mechanism, a motor or an energy supply. Countermeasures can be initiated at an early stage against one or more influences of this type as a result of the improved energy efficiency determining.

The determining of the running resistances can be adapted, in order to minimize a temporal variation of the determined deviation. It has been shown that the temporal variation is a measure of irregularities between various system and belt sections, and can therefore be used for determining the possible improvement potential. To this end, a coefficient can be determined for the temporal variation. One possible measure for this purpose is known as an empirical standard deviation or variance. The determining is ideally adapted in such a way that both the determined sum and the temporal variation are small.

In one embodiment, a signal is output if the temporal variation exceeds a predefined quantity. As a result, a warning can be made about a loss of energy efficiency on the belt conveyor. In further embodiments, a system section efficiency, a change in a standardized system efficiency, a slip operation, undershooting of a predefined power reserve and/or a permanent change of the power distribution above a defined limit value can also be detected. A dedicated warning can be provided in each case.

An energy input of a drive can be determined on the basis of the determined running resistances and can be compared with an actual energy input of the drive. Here, the determining of the running resistances can be adapted in such a way that a difference between the determined and the actual energy input is minimized as far as possible. If the determined energy input matches the actual energy input accurately, the determining can be accurate and/or realistic.

The determining of the running resistance can take place by way of a calculating method which takes into consideration the influence of one or more of the current operating conditions which are indicated in the following text and the structural embodiment of the belt conveyor system. The operating conditions include the local load, the local belt tensioning force, the belt speed, the temperature, the current orientation accuracy of the individual loadbearing roller stations with respect to the structurally predefined belt course, and the grain size and density of the material to be conveyed. The structural embodiment is characterized by troughing angle, spacing of the loadbearing roller stations, diameter and length of the individual loadbearing rollers, and width, weight, type and construction of the conveyor belt which is used. The calculating method can either physically describe the production of the running resistance from the operating conditions and the structural configuration, or can replicate the correlation between the operating conditions and the running resistance by way of mathematical functions. A mathematical and/or physical analogous model of this type typically comprises parameters, by way of which the model can be adapted to reality. Operating parameters of the belt conveyor system can change over time, for instance as a result of deterioration of an orientation state of the conveyor belt with respect to drums, a change of belt properties as a consequence of ageing, contamination of the system, increasing wear of the loadbearing rollers, etc.

The adaptation of the state parameters can take place by means of a self-learning algorithm. The algorithm can comprise, for instance, a Kalman filter or another type of processing heuristics which can compare a provided result with a measured result and can adapt processing, in order to minimize a difference between the results as far as possible.

A first operating parameter can comprise a temperature, and an associated first normal value can comprise a normal temperature of a surrounding area of the belt conveyor. Furthermore, a second operating parameter can comprise a load, and an associated second normal value can comprise a predefined load value of the conveyor belt.

In particular, the said two normal values can be predefined, in order to determine the energy efficiency of the belt conveyor independently of operating parameters which fluctuate during daily operation. With regard to predefined values of the said normal parameters, there can, for example, be a legal or otherwise regulatory requirement which has to be fulfilled by way of the belt conveyor and possibly also has to be documented.

In a further embodiment of the method, one operating parameter comprises a temperature of the conveyor belt. The temperature can be determined at one or at a plurality of points of the conveyor belt, for example by means of sensors which are stationary or are fixed to the belt. A movement resistance of the conveyor belt can be dependent on its deformation resistance. When, in particular, the conveyor belt comprises an elastomer, a rubber product or a polymer, the deformation resistance can decrease as the temperature increases. In other words, it can be easier to deform a warm conveyor belt than a cold one. A deformation can take place along the entire conveyor belt and, in particular, at ends of the conveying section. The movement resistance can be determined with improved accuracy by way of the consideration of the temperature of the conveyor belt.

A computer program product comprises program code means for carrying out a method described herein, the computer program product being run on a processing device or being stored on a computer-readable data storage medium.

An apparatus for monitoring a belt conveyor with a circulating conveyor belt comprises an interface for sensing at least one operating parameter of the belt conveyor; and a processing device. Here, the processing device is set up to determine running resistances at different points along the conveyor belt on the basis of the at least one determined operating parameter; to determine a sum of the determined running resistances over the length of the conveyor belt; to determine a drive power of the belt conveyor on the basis of the sum; and to adapt the determining of the running resistances, in order to minimize a deviation of the determined drive power from a measured drive power. The apparatus can be set up to carry out a method which is described herein. In particular, the processing device can comprise a programmable microcomputer or microcontroller which can be set up to run a computer program product which is described herein. Advantages or features of the method can relate to the apparatus and vice versa.

The invention will now be described in more precise detail with reference to the appended figures, in which:

DETAILED DESCRIPTION OF THE INVENTION

Figure 1:
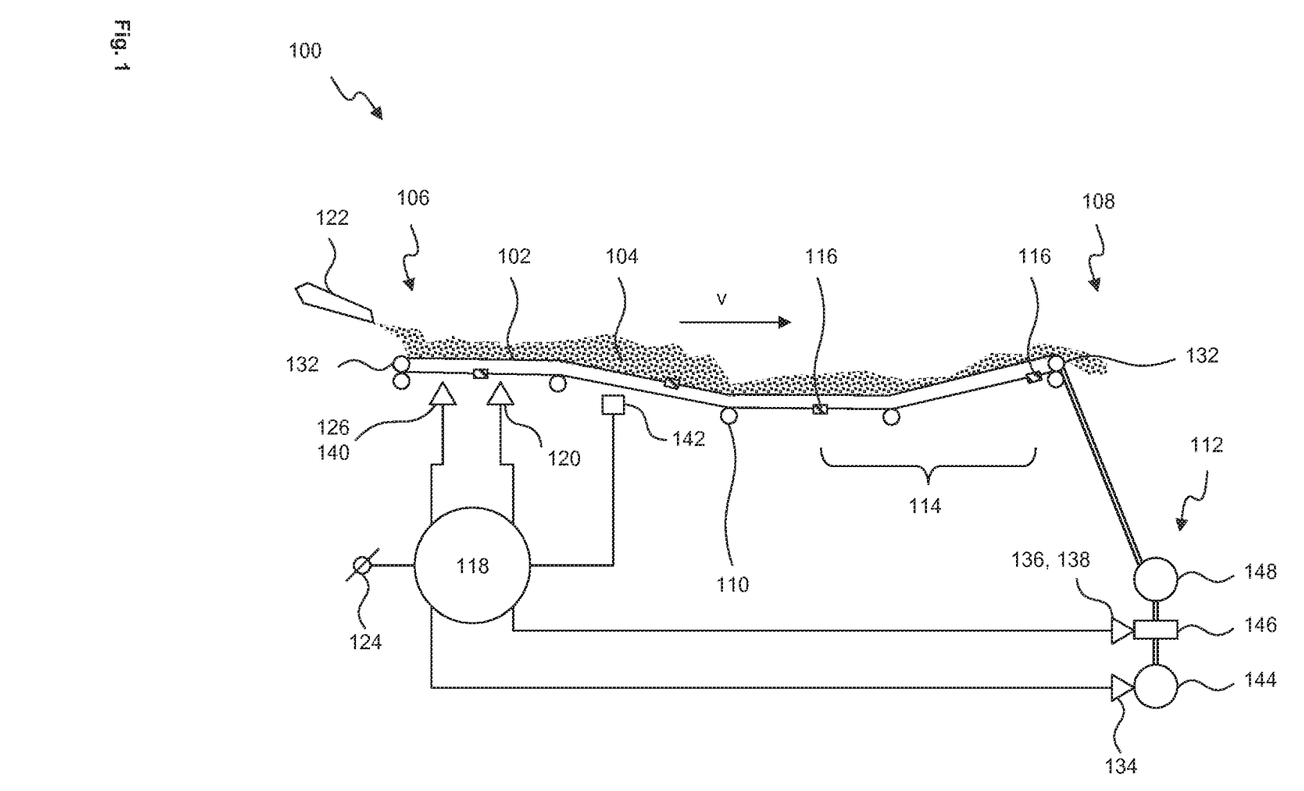
FIG. 1 shows an exemplary system for determining an energy efficiency of a belt conveyor.

FIG. 1 shows a diagrammatically simplified illustration of the basic construction of a belt conveyor 100. The belt conveyor 100 has a circulating conveyor belt 102 which is generally also called a belt or band. Material to be conveyed 104, in particular bulk material, can be transported on the belt 102 from a feed region 106 to a delivery or transfer region 108. The conveyor belt 102 can be deflected upstream of the feed region 106 and in the region of the delivery region 108 by way of deflection rollers 132 (frequently also called deflection drums or drums). The conveyor belt 102 can be guided in the upper and/or lower run by means of a loadbearing roller 110 and, moreover, can be deflected by means of drums 132, it being possible for one or more drums 132 to in each case have a drive 112, in order to set the conveyor belt 102 in motion. The upper section of the belt conveyor system 100 is usually utilized to transport the material to be conveyed 104. The said upper section is called an upper run, and the non-loaded lower part, in which the conveyor belt 102 is returned, is called a lower run. The loadbearing rollers 110 which are arranged in the upper run and in the lower run can be of different configuration.

The belt 102 can comprise a plurality of conveyor belt part pieces 114. The conveyor belt part pieces 114 can be connected to one another by means of connecting sections 116. The entirety of the conveyor belt part pieces 114 together forms the circulating conveyor belt 102. In FIG. 1, the conveyor belt 102 is sketched by way of example in a manner which consists of four conveyor belt part pieces 114. One of the said conveyor belt part pieces 114 has by way of example a conveyor belt part piece length LG. The conveyor belt part piece lengths of the conveyor belt part pieces 114 can be individual and different from one another.

A control device 118 can be provided for operating some or all the functions of the belt conveyor 100. The control device 118 can also be configured in multiple pieces and, in particular, can comprise a programmable microcomputer or microcontroller.

The control device 118 can preferably control a torque or a rotational speed of one or more drives 112 and, in this way, can control the movement, in particular the speed v, of the conveyor belt 102. Signals which characterize an energy consumption of the drives 112 can be fed to the control device 118. Signals of this type can be detected by way of a first sensor system 134.

One of the drives 112 can comprise a motor 144, in particular an electric motor, which is connected to a drivable drum 132 directly or via a, for example, hydrodynamic coupling 146 and/or a gear mechanism 148. The coupling 146 and the gear mechanism 148 can also be configured such that they are integrated with one another, for example in the form of a hydrodynamically controllable gear mechanism which is known under the designation Vericon. In another embodiment, a separate hydrodynamic coupling 146 can also be provided which can, for example, be controllable in terms of its transmission behaviour via its filling with a fluid or via the position of vanes. A rotational speed and/or a torque can preferably be determined at the motor 144, at the coupling 146 and/or the gear mechanism 148, and the said values can be provided to the control device 118. In particular, the torque which is output to the conveyor belt 102 or the drive speed can be determined. To this end, a torque sensor 136 and/or a rotational speed sensor 138 can be provided.

Furthermore, it is preferably provided that signals of a third sensor system 120 are fed to the control device 118, the signals in each case indicating a connecting section 116 between two adjacent conveyor belt part pieces 114 having passed a predefined location of the belt conveyor 100. The third sensor system 120 is preferably arranged in a stationary manner in the belt conveyor system 100. If a connecting section 116 is detected, the position of the connecting section 116 is also known at the same time. In the case of the said determining, the instantaneous speed of the conveyor belt 102 and/or a determining duration for the detection of the connecting section 116 can be taken into consideration. In the case of use of steel cord conveyor belts 114, for example, a coil or a magnetic field sensor can be used as a third sensor system 120 for the detection of connecting sections 116. In the case of use of woven fabric conveyor belts or steel cord conveyor belts, an arrangement for the detection of the compressive spring stiffness of the conveyor belt 102 can be provided as a third sensor system 120.

During running operation of the belt conveyor 100, the length and/or the sequence of conveyor belt part pieces 114 can be determined on the basis of the periodicity of the detection signals which in each case indicate a connecting section 116. As a rule, the overall length of the conveyor belt 102 is also additionally known. An information carrier which can be read out wirelessly can be attached to the conveyor belt 102 for the identification of a connecting section 116. The information carrier can also provide information about an adjacent conveyor belt part piece, for example a length, a material, a type, a manufacturer or a property such as a load-bearing capacity or a bending resistance. An installation date can also be recorded, in order to determine an operating hour count or a revolution count at the belt conveyor 100. The information carrier can be read out, in particular, by means of RFID technology, and is attached between connecting sections 116 in another embodiment.

Furthermore, FIG. 1 sketches a chute 122 by way of example. Via the chute 122, the materials to be conveyed 104 are placed onto the belt 102. A belt weigher 126 can be arranged as one embodiment of a second sensor system 140, for example, in the region downstream (with regard to the conveying direction) of the chute 122. The second sensor system 140 can determine a load, that is to say a weight of the material to be conveyed 104 placed onto the belt 102, and can provide a corresponding weight value as measured value to the control device 118. The second sensor system 140 can also be based on a different measuring principle than that of weight determining, for example on determining of a volumetric flow. In a further embodiment, the loading can also be determined indirectly, for example by it being determined at another point and being assigned locally and/or temporally. For example, a volumetric or mass flow which is fed in or delivered outside the belt conveyor 100 can serve as a reference for this purpose. In addition, a temperature in the region of the belt conveyor 100 can optionally be determined, for example by means of one or more temperature sensors 142. A temperature sensor 142 can be attached in a stationary manner, for example in the region of a drum 132 or between drums 132, or the temperature sensor 142 is fastened to the conveyor belt 102. A movable temperature sensor 102 of this type can be read out wirelessly at a predefined point, for example by means of RFID technology. Here, the temperature sensor 132 can also provide further information, in particular the information addressed above about a conveyor belt part piece 114 or a connecting section 116.

It is proposed to collect information of the belt conveyor 100 during running operation by means of the first sensor system 134, the second sensor system 140, the third sensor system 120 and/or the temperature sensor 142, and to determine a movement resistance along the conveyor belt 102 on the basis of the said information. The movement resistance can be determined, for example, at intervals of approximately one metre along the conveyor belt 102, and is usually dependent, inter alia, on a load, speed or acceleration of the conveyor belt 102. Furthermore, a tensile force profile and/or a power requirement can also be determined along the conveyor belt 102. A procedure which is proposed for this purpose is described, for example, in WO 2017 001 203 A1, to which reference is made explicitly here. A determining result can be provided externally via an interface 124.

Since the conveyor belt 102 is an endless belt, the profile of the tensile force along the conveyor belt 102 should lead after one full pass to an end value which coincides with the initial value. A precise match can be observed rarely in practice, but the deviation of the end value of the tensile forces along the conveyor belt 102 from the initial value should be zero averaged over time. If this is not the case, the tensile force determining can be changed appropriately. The mean deviation of the end values from the initial values of the tensile forces over time can also supply an indication of the state of the belt conveyor system: if the mean deviation (standard deviation) is great, the system sections and/or conveyor belt part pieces are very different in relation to the running resistance which is generated by them, and the harmonization of the sections which are poor in this regard with the best sections will lead to a great improvement of the energy efficiency; if it is low, in contrast, the belt conveyor system is very homogeneous, and a harmonization of the poor sections with the best sections has a correspondingly lower improvement potential.

In respect of the determined tensile forces, a drive power can be calculated which is required to drive the conveyor belt 102 at a predefined time. The determined drive power can be compared with an actual active power of the one or more drives 112. A small deviation of the power values can indicate satisfactory determining of the drive power and/or the tensile force determining which forms the basis. An energy efficiency of the belt conveyor can be determined on the basis of the recorded drive power, system parameters such as an incline or length of the conveyor belt 102 between the feed region 106 and the delivery region 108, and loading with material to be conveyed 104. The said determining applies in each case to current boundary conditions such as a load, an ambient temperature, a conveyor belt 102 which is used, an adjustment of the loadbearing rollers 110, etc.

If the determining of the tensile force over the length of the conveyor belt 102 has reached a predefined quality, a determining model which is used can be used to determine the energy input of the belt conveyor 100 for other values of the operating parameters or other boundary conditions. In particular, normal values for predefined operating parameters can be set, namely a predefined load which, in particular, can be assumed to be distributed uniformly over the conveying section, or a predefined ambient temperature. As a consequence, a value for the energy efficiency of the belt conveyor 100 can be provided, which value is independent of current values for the operating parameters. The determined energy efficiency can be used firstly for determining a temporal development, with the result that, for example, required maintenance of the belt conveyor 100 can be determined or an efficiency improvement, for instance by way of structural measures, can be documented. Secondly, the determined energy efficiency can be used to compare various belt conveyors 100. Belt conveyors 100 of fundamentally or largely different construction, for instance in surface mining and below ground, can thus also be placed into context in terms of energy technology and therefore also environmental technology or economic aspects.

Figure 2:
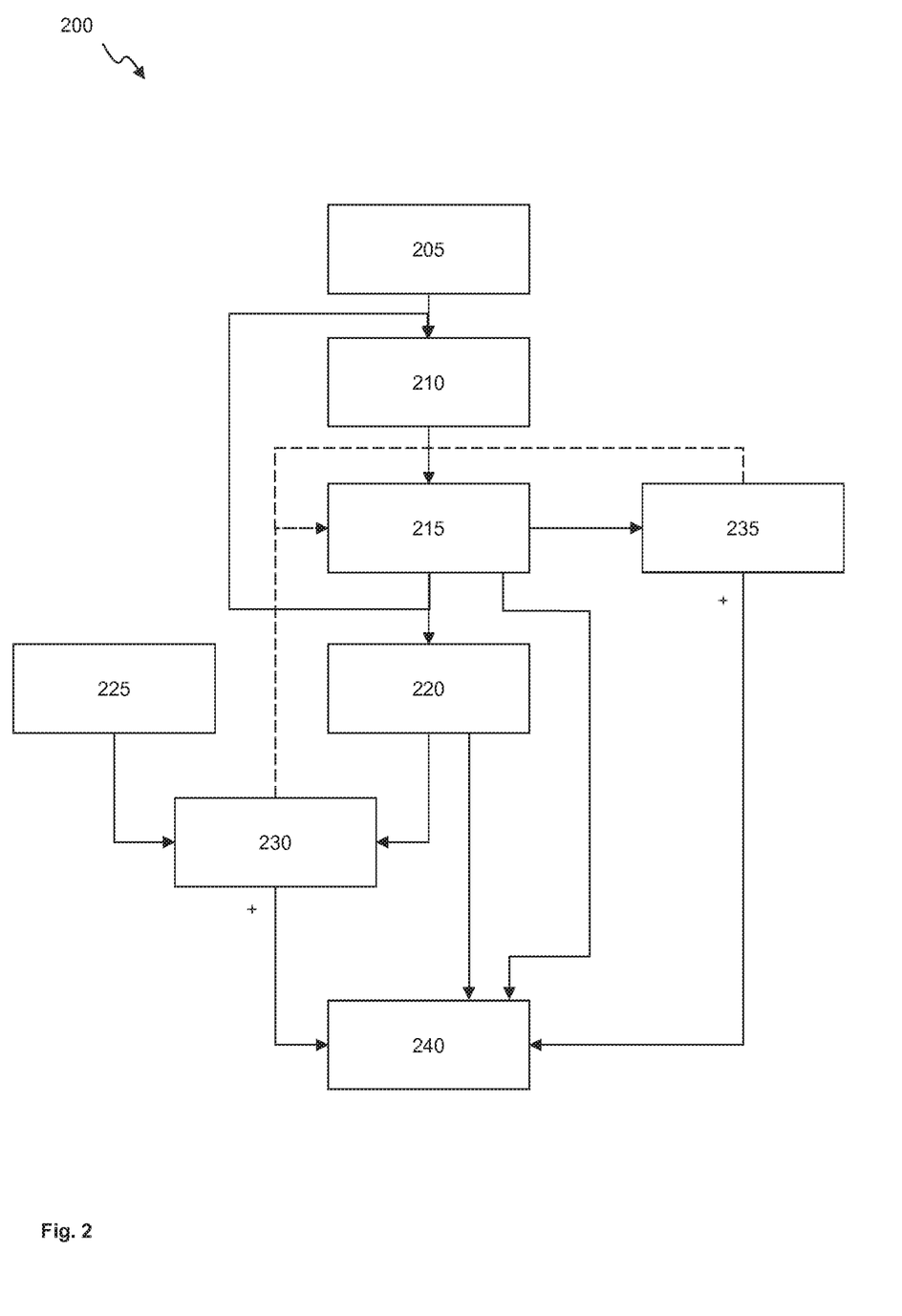
FIG. 2 shows a flow chart of an exemplary method for determining an energy efficiency of a belt conveyor.

FIG. 2 shows a method 200 for determining the energy efficiency of a belt conveyor 100. The method 200 is preferably set up to run on the control device 118, and can be present completely or in parts in the form of a computer program product which can be stored on a computer-readable data storage medium.

In a step 205, system parameters of the belt conveyor 100 can be determined which describe the layout of the belt, the arrangement and type of drums 132 and the drives 112, and the position of load sensor system 140, belt section sensor 120, etc. System parameters usually do not change or change only very slowly during running operation, with the result that the said step has to be carried out only once, only after an intervention into the construction of the belt conveyor 100 or only at predefined time intervals of several days, weeks or months.

In a step 210, predefined operating parameters are sensed at the belt conveyor 100. Operating parameters usually characterize running operation of the belt conveyor 110 and are considerably more variable than system parameters. A sampling frequency of operating parameters can be fixedly predefined and can be, for example, 1 Hz, it being possible for a higher sampling frequency to permit improved processing. The sampling frequency can also be dependent on the conveying speed v, and is preferably selected in such a way that a sufficiently accurate resolution is achieved in relation to the overall length of the conveyor belt 102. A sampling rate of 1 Hz on an exemplary belt conveyor 100 can correspond to sampling every 7.5 m, approximately. The operating parameters can include, in particular, the movement speed v, a load of the conveyor belt 102, an ambient temperature, a temperature of the conveyor belt 102, a drive torque, a drive rotational speed, an active power or an energy input of a drive 112. The sampled operating parameters are preferably stored at least temporarily for subsequent processing.

In step 215, a running resistance of the conveyor belt 102 along its conveying direction is determined on the basis of the collected information. The determining can be carried out continuously or with regard to predefined distances of the conveyor belt 102. The steps 210 and 215 are preferably operated continuously as long as the belt conveyor 100 is in operation. In one variant, the determining in step 215 can also be carried out on previously stored information of step 210.

In step 220, an energy input of the belt conveyor 100 can be determined on the basis of the determined information, in particular on the basis of the running resistance. In addition, in a step 225, an actual energy input or an active power of the drive 112 or of the one or more motors 144 can be determined. The two energy inputs can be checked for matching in step 230. If the two energy inputs lie close to one another, with regard to a predefined criterion, the determining of the running resistance and the energy input is correct. If the energy inputs lie further than a predefined amount apart, the determining is not yet accurate enough. The determining operations in steps 215 and/or 220 can be adapted on the basis of the determined deviation.

In another embodiment, one or more models used within the context of one of the determining operations 220, 225 can be changed between input and output parameters in terms of their processing parameters. To this end, different adaptations of models can be tested, in order to find one which fits as satisfactorily as possible with the present data material. It can be irrelevant here whether the adaptation can be performed physically or not; merely how satisfactory the model turns out is usually decisive. The testing can be assisted in the manner of a Monte Carlo method, an evolution strategy, by means of mixed integer optimization or a greedy algorithm, in order for it to be possible to lead to improved results, to find a satisfactory result more rapidly, or to evaluate the quality of the result in an improved manner. In a further embodiment, a self-learning algorithm or a Kalman filter can be used for determining. In other embodiments, a distinction can be made between learning operation for rapid adaptation of the determining to the present belt conveyor 100 and an implementation mode, in which only slower adaptations or even no more adaptations to the determining operations are performed. In other embodiments, the two operating types can be operated in parallel or can coincide.

Regardless of this, in step 235, a sum of the determined running resistances over the overall length of the conveyor belt 102 can be determined. Here, the overall length relates to one complete revolution of the conveyor belt 102. If the running resistance is determined continuously, an integral of the localized running resistance can also be determined via running resistances for sections of the conveyor belt instead of a sum. In both cases, the start is usually made at an arbitrary point, and in each case one tensile force difference is determined for predefined sections of the conveyor belt 102 which adjoin one another. If the part piece under consideration runs over a drive drum 132, for example, its drive force corresponds to the tensile force difference in the conveyor belt 102 at points upstream and downstream of the drive drum 132. The tensile force difference can be evaluated as positive on an uphill slope and as negative on a downhill slope. The tensile force differences of all sections of the conveyor belt 102 ideally add up to the value, with which the start was made at the selected point. The magnitude of the deviation of the sum from the initial value indicates a determining quality of step 210 and/or 215. A high deviation can characterize a low determining quality, and vice versa. If the determining quality is low, the determining of the tensile force can be adapted by way of adaptation of the above-described models, in order to improve the quality of the determining.

The determining of the tensile force is currently frequently carried out in accordance with the specifications of DIN 22101. It is proposed not to assume that the F-value which is used there is static, but rather to determine it in the way described here in a manner which is dependent on predefined operating parameters, in particular the ambient temperature and/or the load.

During continuous operation of the belt conveyor 100, the said deviation can also be determined periodically or continuously. The temporal variance of the deviation can also be used as a measure of the quality of the determining, that is to say a measure for a temporal change of the deviation. A low variance usually indicates a high determining quality, and vice versa.

In an experiment on an exemplary belt conveyor 100, after the evaluation of data over several days, a deviation of the determined energy input from the measured energy input in the range of approximately from 0.1 to 0.3% of the installed drive power could be achieved.

If a sufficiently high determining quality can be achieved, that is to say if, in particular, the said deviations in the steps 230 or 235 lie below predefined associated threshold values, the energy efficiency of the belt conveyor can be determined in step 240 with regard to predefined normal parameters. The normal parameters can relate, in particular, to a predefined load of the conveyor belt 102 with material to be conveyed 104, which load is preferably homogeneous over the length of the upper run, and/or a predefined ambient temperature. In some circumstances, the energy efficiency can be determined with regard to values which the operating parameters under observation have never assumed. Here, the determining of the energy efficiency preferably takes place on the basis of the procedure and performed adaptations or optimizations in step 215 and/or 230.

Different variations, developments and embodiments are conceivable in respect of the above-described determining operations.

Belt and System Section Efficiency

The quality of the individual conveyor belt part pieces 114 and that of the individual system sections in relation to energy efficiency can be determined over time by virtue of the fact that a determined efficiency is weighted in each case with a current load, and is assigned to the respectively involved individual belt or system sections. Determined energy efficiencies of the individual conveyor belt part pieces 114 or system sections can be observed over time, in order to compare the part pieces 114 or system sections with one another or with a mean value. Thus, for example, a particularly energy-efficient or a particularly energy-inefficient part piece 114 and a system section can be detected. Subsequently, a more precise analysis can indicate reasons for the differing energy efficiency. In particular, a potential for optimization of the energy efficiency can be determined and exploited in a targeted manner.

For example, a conveyor belt part piece 114 which is below average in terms of energy can be identified, which conveyor belt part piece 114 can be exchanged for another, in order to improve the energy efficiency of the belt conveyor 100 overall. Experiences about the quality, the durability or the price-performance ratio of different conveyor belt part pieces 114 can be utilized in the case of new procurement. The experiences can also be used for the optimization of a product which is used.

Mechanical and Electric Performance Limit

A belt conveyor 100 can be overloaded, which can lead to an unplanned downtime.

In a first case, an electric performance limit of the belt conveyor 100 can be exceeded during operation. Here, at least one of the drives 112 can run above its projected performance over a relatively long time, as a result of which heating can occur until a monitoring device which is provided for this purpose switches off the system. The drive 112 can comprise, for example, an asynchronous motor which, in the case of overloading, is switched into increasing slip, with the result that the degree of efficiency drops and electric power is used increasingly to heat the motor. If the belt conveyor 100 comprises a plurality of drives 112, an improved distribution of the load to the individual drives 112 can already lead to a significant delay or avoidance of downtime on account of overloading.

In a second case, a mechanical performance limit of the belt conveyor 100 or of one of its elements can be exceeded. For example, slip can occur at a drive drum 132 because the belt tension which is necessary for the transmission of the drive power which is used is not sufficient (infringement of Eytelwein's Formula). Since a sliding friction coefficient between the drive drum 132 and the conveyor belt 102 is generally considerably lower than a coefficient of static friction, the circumferential force which can be transmitted at the said drive 112 drops in the case of occurrence of slip, as a result of which the load of the other drives 112 rises. At the same time, heating takes place in the slip zone on account of the power loss which is produced by way of the slip (circumferential force times differential speed), which can rapidly lead to a fire if the belt conveyor 100 is not switched off beforehand. Automatic switching off can take place either by way of a slip monitoring device at the slipping drive drum 132 or by way of performance monitoring at one of the other drives 112.

A relatively long downtime of the belt conveyor 100 can occur in both cases, since the reason for the overloading has not yet been eliminated by way of the switching off. Moreover, starting up of the belt conveyor, in the case of which the conveyor belt 102 with the material to be conveyed 104 has to be accelerated from the standstill, can represent a particular load for the belt conveyor 100, with the result that there is the risk of a renewed failure.

An electric performance limit is usually known for each motor 144. A performance reserve can be determined for each motor 144 by way of the performance determining or performance measuring, which performance reserve indicates how far away the motor 144 is from its performance limit. If the drive power of the belt conveyor 100 rises proportionally by more than the smallest of the performance reserves of all motors 144, the corresponding motor can be overloaded.

By way of the use of the determining model proposed herein of the belt conveyor 100, the belt tensile forces upstream and downstream of the drive drums 132 can be calculated at any time, whereby the mechanical performance limit of a drive 112 can also be calculated as follows. It is the case that:

$$P_{max,elektrisch} = P_{max,mechanisch}/\eta = U_{max}*v/\eta$$

$$U_{max} = T_{1,max} - T_2 = T_2*(e^{\mu\alpha}-1)$$

wherein:

$P_{max,elektrisch}$ is the maximum electric active power of the drive 112 which can be transmitted, $P_{max,mechanisch}$ is the maximum performance of the drive 112 which can be transmitted mechanically, $\eta$ is the degree of efficiency of the drive 112, $U_{max}$ is the maximum circumferential force which can be transmitted at an associated drive drum 132, v is the belt speed at the said drive drum 132, $T_{1,max}$ is the maximum possible belt tensile force at the run-on point (in the case of motorized operation), or at the run-off point of the said drive drum 132 in the case of generator operation, $T_2$ is the possible belt tensile force at the run-off point (in the case of motorized operation), or at the run-on point of the said drive drum 132 in the case of generator operation, $\mu$ is the coefficient of friction between the conveyor belt 102 and the drive drum 132, and $\alpha$ is the wraparound angle of the conveyor belt 102 around the drive drum 132 as a radian measure.

Here, a drive 112 is understood to mean a drive drum 132 with one or at most two drive trains with in each case one motor 144.

A maximum possible drive power results from the performance limit of a drive 112 (mechanical or electric) which is achieved first of all. By way of the use of the determining model described herein of the belt conveyor 100, it can be determined which conveying performance can be produced here. It therefore becomes possible to utilize the performance reserves of the belt conveyor 100 in an improved manner and at the same time to reduce the risk of overloading.

For example, the belt conveyor 100 can be operated closer to its performance limit, since both the said performance limit and a currently achieved performance are known. An overload as in one of the above-described cases which would entail system downtime can nevertheless be avoided reliably.

Slip Monitoring

If slip occurs at a drive drum 132, the drive power at the said drum 132 drops suddenly to a lower value which is determined by the sliding friction coefficient which then prevails. At the same time, the drive power which is then missing has to be additionally produced by the other drives 112. A slip operation of this type can be detected at an early stage by way of a comparison of the drive powers of the drives 112. A countermeasure, for example a reduction of the belt speed or a redistribution of the drive powers to the drives 112, can reduce the risk of slip.

The coefficient of static friction $\mu$ can be determined from the belt tensile forces immediately before the occurrence of the slip by way of re-formulating of Eytelwein's Formula which was indicated above:

$$\mu = \ln(T_1/T_1)/\alpha$$

For the said determining operation, the drive power can optionally be filtered, in order, in particular, to reduce measurement noise.

In the case of every slip operation, the coefficient of static friction which is determined in this way can be stored together with the currently prevailing ambient conditions, that is to say, in particular, the operating parameters which are observed for the determining of the drive power, and can be used for future prognoses of the mechanical performance limit. The sliding friction coefficient which is active during the slip operation can be calculated and stored during the slip in an analogous manner from the belt tensile forces.

In addition, the said procedure can supply more accurate information over time, by way of which information coefficients of static or sliding friction may actually be calculated in the case of the conveyor belt part pieces 114 or drum linings which are used. In particular, an infelicitous material pairing can thus be identified if, for example, a certain drum lining in combination with a certain conveyor belt part piece 114 results in a below-average coefficient of friction. Owing to a lack of improved knowledge, table values have frequently been used up to now for coefficients of friction, in order to design or to operate the belt conveyor 100.

Performance Distribution Between the Drives

In the ideal state, the required drive performance of a belt conveyor 100 is divided among the drives 112 in such a way that each motor 144 experiences the same load factor with regard to its nominal performance, that is to say, for example, all the motors 144 run at approximately 70% of their load capacity. In practice, however, considerable differences sometimes occur between the load factors, with the result that only a lower than projected conveying performance is possible at most. Possible causes for this comprise:

(1) tolerances of the involved motors 144,
(2) different supply voltages (for example, on account of line losses in the case of long feed lines),
(3) different transmission ratios at the drives 112,
(4) different drum diameters (for example, on account of manufacturing tolerances or wear of drum linings),
(5) different belt stretch on account of different belt tensile forces; in particular, in the case of woven fabric belts, the elasticity of which is from 5 to 15 times greater as that of steel cord belts in the case of an identical nominal strength.

An active compensation and therefore an ideal load distribution can take place in the case of regulated drives 112, but at the cost of a lower degree of efficiency of the belt conveyor 100, since the drive 115 which provides the most conveying power is lowered to the level of the other drives 112 via an additional (electric or hydrodynamic) slip.

Figure 3:
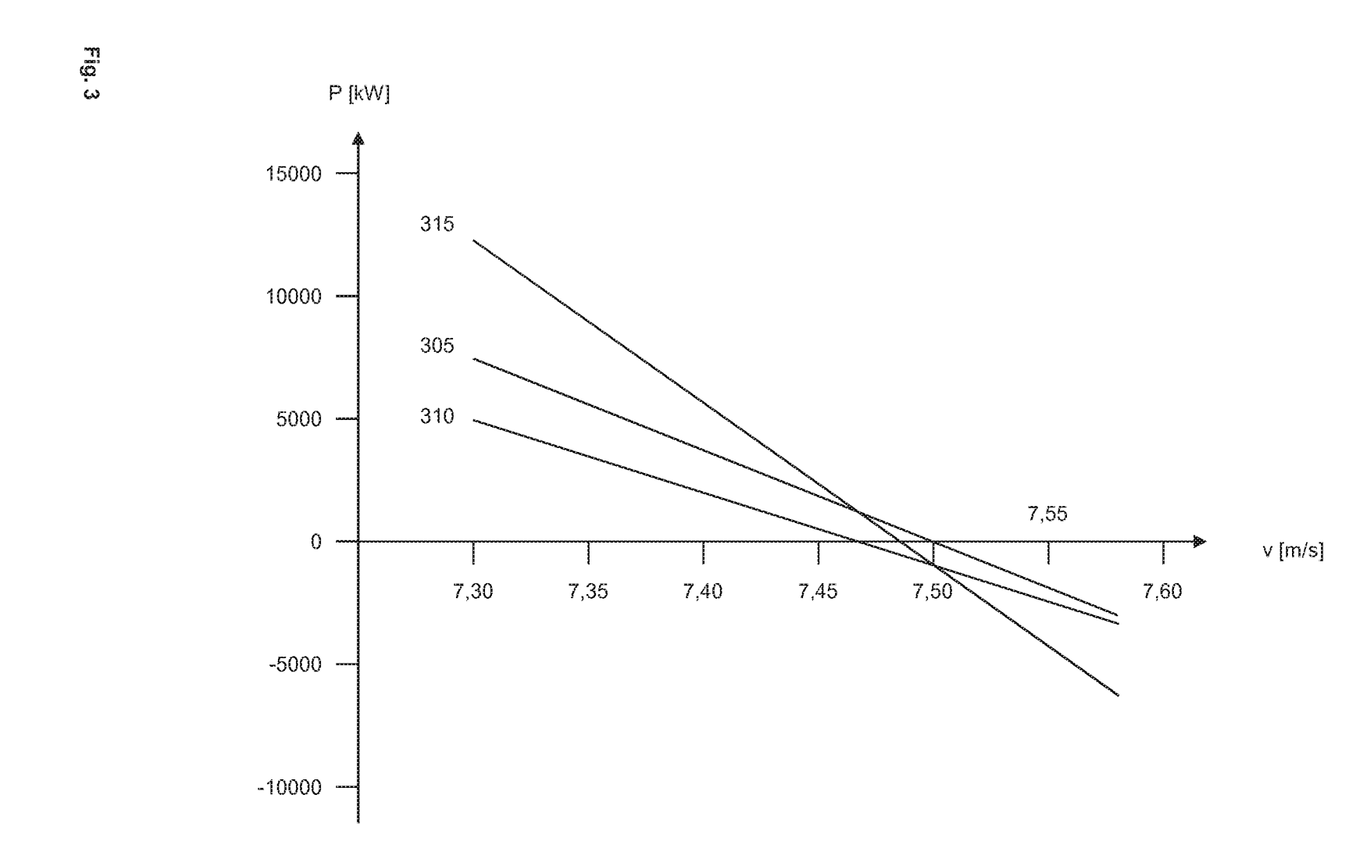
FIG. 3 is a diagram showing a correlation between motor performance outputs (vertical) and a belt speed (horizontal).

FIG. 3 shows a correlation between motor performance outputs (vertical) and a belt speed (horizontal). A first and a second drive 112 are operated with different drum diameters, slightly different motor characteristic curves and/or different belt stretch. A first characteristic curve 305 shows the motor performance of the first drive 112 for various belt speeds, a second characteristic curve 310 shows the motor performance for the second drive, and a third characteristic curve 315 shows the motor performance for the two drives 112 together which are operated in the same belt conveyor 100.

On account of causes (1) and (2) mentioned above, the characteristic curves 205 and 310 have different gradients; causes (3), (4) and (5) bring about parallel shifts in the illustration.

By way of the use of a determining model of the belt conveyor 100, the characteristic curves 305 and 310 can be determined from the operating parameters of the belt conveyor 100. The said operating parameters comprise, in particular, the belt speed at one point, known belt tensile forces at the said point and also at all drive drums 132, and the known active power at all motors 144.

Whereas the transmission ratios (3) do not change during operation and the influence of the belt stretch (5) can be calculated directly, the influences (1), (2) or (4) can change over time. By way of monitoring of the said characteristic curves 305 and 310 in each case with regard to gradient and vertical position, changes in the performance distribution and the causes on which they are based can be detected at an early stage and corresponding countermeasures can be initiated in an improved manner.

Event-Based Notifications

By way of the use of the determining model proposed herein of the belt conveyor 100 during operation thereof, events which are significant for the operation and maintenance can be detected automatically and can be transmitted to the responsible supervisor or supervisors (by SMS, email or the like) with all information necessary for the assessment. Events of this type can comprise, for example, the following:

- exceeding of a predefined threshold value of the belt or system section efficiency at a predefined or arbitrary section;
- changing of the standardized system efficiency, it being possible for the standardization to take place, in particular, on the basis of a predefined reference temperature and/or reference load;
- undershooting of a predefined minimum performance reserve;
- occurring of a slip operation;
- permanent changing of the performance distribution between the drives 112, optionally above a defined limit value.

Automatic messages of this type can be archived, for example for later statistical evaluation. It can likewise be provided that the receipt of a message is to be confirmed by a predefined recipient. A commentary of an operating person, a selection of a detected cause or a taken measure can optionally also be stored. A maintenance state or an availability of the belt conveyor 100 can be improved considerably in the course of time by way of consistent use of this function.

Load Spectrum

By way of the use of the proposed determining model of the belt conveyor 100, a local load 104 and a local belt tensile force are known at every time for every point along the endlessly circulating conveyor belt 102, and also for every point of the belt conveyor 100. These can be assigned both to a conveyor belt part piece 114 and a system section.

The said values can be stored in each case for a predefined time period. For each stored time period, the load spectrum can be indicated for each conveyor belt part piece 114, for each connecting section 116 or for each system section and the stationary parts of the belt conveyor 100 which are present in the said section, for instance loadbearing rollers and drums 132. As a result, it becomes possible, in the case of failure of a component, for it to be compared with others and for statements to be made about the achievable service life of the said component. Thus, an objective feasibility study can be assisted in the case of replacement procurement or targeted development of components.

Consideration of the Temperature of the Conveyor Belt

The energy efficiency which is averaged over one complete belt revolution is as a rule not constant, since the running properties of the conveyor belt 102 or the loadbearing rollers 132 are dependent in each case on its/their current temperature. The temperatures can be influenced by way of the ambient temperature or a fluctuating conveying stream. Among the operating parameters which are used to describe the performance requirement of the belt conveyor 100 with consideration of the current operating state, one or more can replicate the influence of the belt temperature on the running resistance.

The belt temperature can be measured directly, in particular, and can be imported into the calculation model. It is further preferred here that the temperature of the conveyor belt 102 is determined at a plurality of points along the conveying section or the conveyor belt 102. As an alternative, temperatures of one or more drums 132 can also be determined. The temperature of a drum 132 can correspond in each case to the temperature of the conveyor belt 102 at the same point. The temperature sensors 142 are preferably distributed as uniformly as possible over the conveying section, with the result that respective adjacent sensors are at substantially the same spacing from one another.

Thermodynamic Belt Model

The measurement of the belt temperature can require complicated sensors or a fault-prone long-distance transmission of data, in particular if a plurality of temperature sensors 142 are to be used at different points of the belt conveyor 100. The fewer temperature sensors 142 which are used, the less accurate the temperature determining can be, with the result that the temperature influence can be traced only imprecisely or with a relatively great delay in some circumstances.

The determining of the belt temperature can therefore comprise a thermodynamic model, in which, for example, a first parameter describes the thermal capacity of the conveyor belt 102 and a second parameter describes the thermal transfer between the conveyor belt 102 and the surroundings. Since the conveyor belt 102 is usually heated by way of deformation work which is performed, its temperature generally lies above that of the surroundings.

The heat input can be calculated from the corresponding parts of the running resistance which lead to heating of the conveyor belt 102 or the loadbearing rollers 132. One possible realization of the said thermodynamic model is represented by the following equation:

$$t_{Gurt,i+1} = t_{Gurt,i} + k_1 \cdot P_{W\"armeeintrag} - k_2 \cdot (t_{Gurt,i} - t_{Umgebung})$$

wherein:

$t_{Gurt,i}$ is the belt temperature at the time i,
$t_{Gurt,i+1}$ is the belt temperature at the time i+1,
$t_{Umgebung}$ is the ambient temperature at the time i+1,
$P_{W\"armeeintrag}$ is the heat input from the running resistance,
$k_1$ is a first parameter which depicts the thermal capacity of the conveyor belt 102,
$k_2$ is a second parameter which depicts the thermal transfer of the conveyor belt 102.

The starting point here is a time grid, in which adjacent times i, i+1 are separated from one another in each case by a constant time. In one variant of the model, it is not the temperature of the overall conveyor belt 102 which is observed, but rather the temperature of the conveyor belt part piece 114 which carries each loading block is calculated for the latter from the feed 106 to the delivery 108.

A higher thermal transfer is preferably assumed for the running belt conveyor 100 than for the stationary belt conveyor 100.

An ambient temperature can be set as starting temperature $t_{Gurt,0}$ at the time i=0. This is appropriate, in particular, if the belt conveyor 100 has been at a standstill for longer than a predefined time. The ambient temperature can be determined by means of a dedicated sensor or can be obtained, for example, from a weather observation or forecasting service.

This very accurate and detailed observation of the belt temperature can improve the calculation of the overall conveyor belt system 100 and can match the latter very closely to reality. Extremely accurate statements in respect of the overall energy efficiency, the efficiency of individual sections and conveyor belt part pieces 114, and in respect of modifications thereof, are therefore possible.

The more accurate the determining of the running resistance, the better even small measures for efficiency improvement can be documented. In Germany, improvements of the energy efficiency and specifically the valid and complete documentation of the data source and calculation form the basis for an exemption from the electricity tax § 10 StromStG [German Electricity Taxation Act]. By means of the procedure which is specified herein, the energy efficiency of a belt conveyor 100 can be indicated accurately and in a manner which relates to predefined normal parameters.

LIST OF REFERENCE NUMERALS

- 100 Belt conveyor, belt conveyor system
- 102 Conveyor belt, belt
- 104 Material to be conveyed, load
- 106 Feed region
- 108 Delivery or transfer region
- 110 Loadbearing roller
- 112 Drive
- 114 Conveyor belt part piece
- 116 Connecting section of two conveyor belt part pieces
- 118 Control device
- 120 Third sensor system, connecting-section sensor
- 122 Chute
- 124 Interface
- 126 Belt weigher
- 132 Deflection roller, drum, optionally drivable
- 134 First sensor system (energy input)
- 136 Torque sensor
- 138 Rotational speed sensor
- 140 Second sensor system (load sensor)
- 142 Temperature sensor
- 144 Motor
- 146 Coupling, in particular hydrodynamic
- 148 Gear mechanism
- 200 Movement
- 205 Determining of system parameters
- 210 Determining of operating parameters
- 215 Determining of running resistance
- 220 Determining of energy input
- 225 Sensing of energy input
- 230 Match?
- 235 Deviation of the sum over the belt length close to zero?
- 240 Determining of general energy efficiency
- 305 First characteristic curve (first drive)
- 310 Second characteristic curve (second drive)
- 315 Third characteristic curve (both drives)

The invention claimed is:

1. A method of monitoring a belt conveyor with a circulating conveyor belt, the method to be executed on a control device, the method comprising:
    determining at least one operating parameter of the belt conveyor;
    determining running resistances at different points along the conveyor belt on a basis of the at least one operating parameter;
    determining a sum of the running resistances over a length of the conveyor belt;
    determining a drive power of the belt conveyor on a basis of the sum of the running resistances;
        comparing the measured drive power with the determined drive power; and
    if a deviation of the determined drive power from a measured drive power exceeds a given threshold, adapting the determining of the running resistances, in order to minimize the deviation of the determined drive power from the measured drive power, and to thereby minimize a temporal variation of the determined deviation.

2. The method according to claim 1, further comprising determining the energy efficiency of the belt conveyor on a basis of an adapted determination with regard to a predefined normal value being assumed by one of the operating parameters.

3. The method according to claim 1, which comprises determining an energy input of a drive on a basis of the determined running resistances and comparing the determined energy input with an actual energy input of the drive, and adapting the determining of the running resistances in order to minimize a difference between the determined energy input and the actual energy input.

4. The method according to claim 1, further comprising determining a temporal variation of the determined deviation.

5. The method according to claim 4, further comprising outputting a signal when the temporal variation exceeds a predefined amount.

6. The method according to claim 1, wherein the step of determining the running resistance comprises determining with a characteristic diagram, and the step of adapting comprises changing the characteristic diagram.

7. The method according to claim 1, wherein the step of determining the running resistance comprises utilizing a self-learning algorithm.

8. The method according to claim 2, wherein a first operating parameter is a temperature, and an associated first normal value is a normal temperature of a surrounding area of the belt conveyor, and a second operating parameter is a load, and an associated second normal value is a predefined loading value of the conveyor belt.

9. The method according to claim 2, wherein one of the operating parameters is a temperature of the conveyor belt.

10. A computer program product, comprising non-transitory program code for carrying out the method according to claim 1 when the program code is executed by a processor, the computer program code being stored on a computer-readable data storage medium or being run on a processing device.

11. An apparatus for monitoring a belt conveyor with a circulating conveyor belt, the apparatus comprising:
    an interface for sensing at least one operating parameter of the belt conveyor; and
    a processing device configured to:
        determine running resistances at different points along the conveyor belt on a basis of the at least one operating parameter;
        determine a sum of the running resistances at the different points over a length of the conveyor belt;

determine a drive power of the belt conveyor based on the sum of the running resistances to define a determined drive power;

compare a measured drive power with the determined drive power; and if a deviation of the determined drive power from the measured drive power exceeds a given threshold, adapt the determining of the running resistances, in order to minimize the deviation of the determined drive power from a measured drive power, wherein the determining of the running resistances is adapted in order to minimize a temporal variation of the determined deviation.

* * * * *